D. FRISOLI.
SPOOL OR REEL.
APPLICATION FILED MAR. 31, 1913.
1,095,723.
Patented May 5, 1914.
2 SHEETS—SHEET 1.
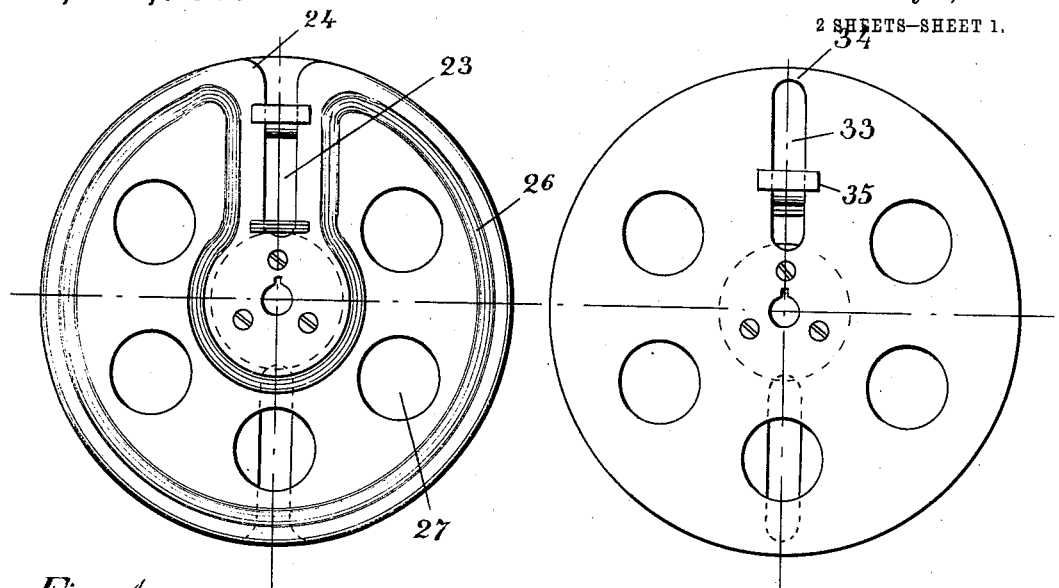
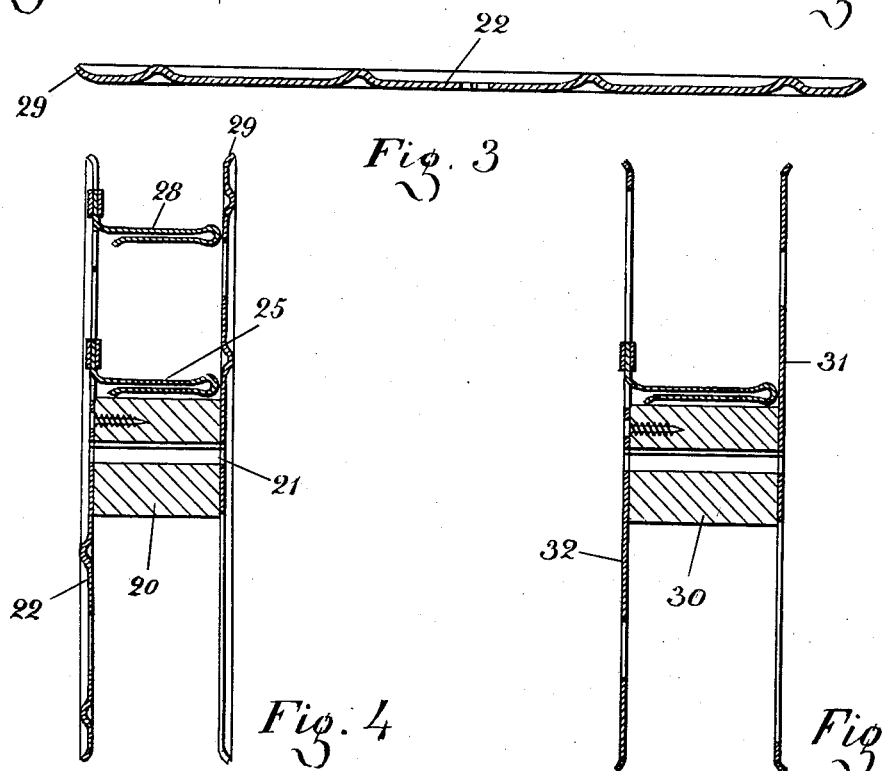
WITNESSES:
INVENTOR
Domenico Frisoli
BY
ATTORNEY

D. FRISOLI.
SPOOL OR REEL.
APPLICATION FILED MAR. 31, 1913.

1,095,723.

Patented May 5, 1914.

2 SHEETS—SHEET 2.

WITNESSES:
A. Abeloff
Louis H. Freedman

INVENTOR
Domenico Frisoli
BY Guido M. Sacerdote
his ATTORNEY

UNITED STATES PATENT OFFICE.

DOMENICO FRISOLI, OF NEW YORK, N. Y.

SPOOL OR REEL.

1,095,723. Specification of Letters Patent. Patented May 5, 1914.

Application filed March 31, 1913. Serial No. 758,015.

*To all whom it may concern:*

Be it known that I, DOMENICO FRISOLI, a subject of the King of Italy, residing in the borough of Manhattan, city, county, and State of New York, have invented certain new and useful Improvements in Spools or Reels, of which the following is a full, clear, and exact description, reference being had to the accompanying drawings, forming a part of this specification.

This invention relates to spools or reels, and especially to reels for moving picture films, the object being to provide a reel upon which the film may be quickly put in place, together with improved means for attaching the end of the film to the reel without damage to the film.

A further object of this invention is to provide improved means whereby two broken ends of a film can be quickly joined together in order not to stop for any length of time the operation of the machine, said joining means being quickly attached to or detached from my improved reel.

With these and other objects in view as will more fully appear as the description proceeds, my invention consists in the construction and arrangement of parts hereinafter set forth and described, the novel features of which are set forth in the appended claims.

The film reels ordinarily used in moving picture shows consist of a pair of circular sheet metal plates with a hub at the center, the hub being provided with means for retaining the end of the film, said means being usually constituted by a spring catch. Said retaining means are generally fixed to said hub and require a somewhat lengthy operation in order to fix the film to the reel, it being rather difficult to insert the hand between the flanges of the reel. To avoid this defect, I provide means for attaching the end of the film, which can be moved away from the hub of the reel to a point near the circumference of the same, or which may be entirely detached from said reel; I also provide a reel of improved construction, adapted to be used in connection with said attaching means.

Figure 6:
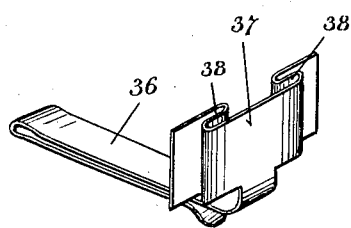
Figure 7:
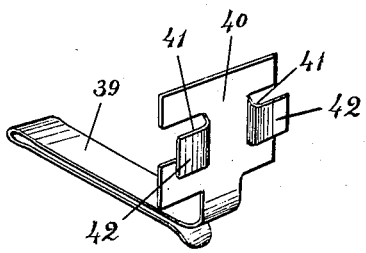
Figure 8:
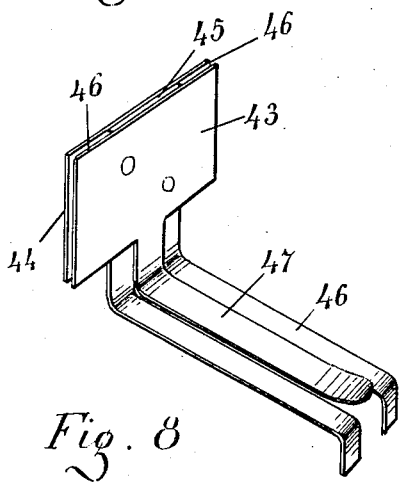
Figure 10:
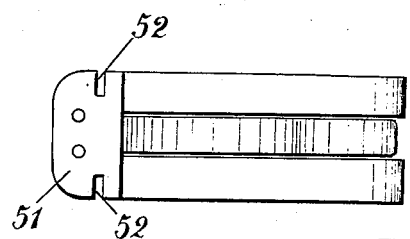
Figure 9:
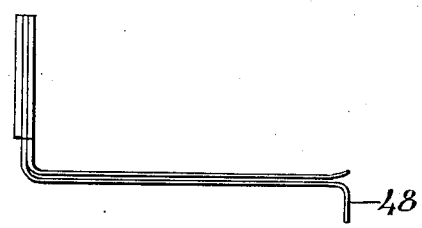
Figure 11:
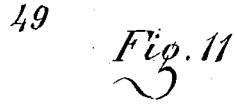

Referring to the drawings, Figure 1 is a front view of a moving picture film reel constructed in accordance with my invention, showing an attaching clip and joining clip inserted in one of the slots; Fig. 2 is a front view of a modified form of a moving picture film reel; Fig. 3 is a cross sectional view on an enlarged scale of one of the flanges of the reel shown in Fig. 1, showing the reinforcing bead; Fig. 4 is a side cross sectional view of the film reel shown in Fig. 1; Fig. 5 is a side cross sectional view of the reel shown in Fig. 2; Figs. 6 and 7 are perspective views of two different forms of clips which may be used in connection with my improved reel; Fig. 8 is a perspective view of another form of clip; Fig. 9 is a side view in elevation of the same; and Figs. 10 and 11 are respectively a plan view and a side view in elevation of another form of clip which may be used in connection with my improved reel.

The reel illustrated in Figs. 1, 3 and 4 is composed as usual of a hub 20 and two side flanges 21, 22 attached to the same; said hub is made of wood or of sheet metal, as desired, and said flanges are preferably made of sheet metal.

In the preferred form of my invention illustrated in said Figs. 1, 3, 4, I provide each flange with a radial slot 23, extending from the hub to the edge of said flange and opening on said edge. I prefer to make said slot with an enlarged opening, which in the drawing is shown obtained by rounding up the portion connecting its sides with the edge of the reel as shown at 24. To insert a film on said reel I employ a clip 25 of any suitable form which may be inserted through and retained by said slot 23, as illustrated in Fig. 4; the end of the film is first inserted in said clip and then the clip itself is inserted through the slot in one of the flanges, and moved toward the hub of the reel; in this way the winding of the film under said reel can be started.

It is obvious that a reel can also be built having only one flange provided with said slot, but for convenience of operation, I prefer to provide each flange with a slot so that the reel can be used on either side; the flanges are however mounted on the hub in such a manner that the slots will be staggered in relation to each other, so that the device will not be weakened at both sides at the same time.

To further stiffen said flanges, I provide them with a reinforcing bead 26, which may be embossed by means of dies, and which runs close to the circumference and to the sides of the slot provided in said flange.

As customary in similar devices, my improved reel is preferably provided with holes or openings 27 on the flanges, said holes being intended to lighten the same without impairing its rigidity.

Such construction of film reel has the further advantage of providing a convenient means for joining the two ends of a film when broken, this being quite a common happening in the operation of moving picture films. When such an inconvenience occurs during the operation, the loose end of the portion of the film still to pass upon the reel, is wound by hand on the same for several times in order to give a grip to the reel and enable the operation of the device to be continued; in doing so, a considerable portion of the pictures on the film is lost for projection purposes.

With my improved device when a film breaks during the operation, I insert the two loose ends thus produced in a clip 28, similar to clip 25, and then I insert said clip through slot 23, illustrated in Fig. 1; it is clearly seen that said clip constitutes a new support for the portion of the film still to be wound upon the reel, and that in this manner a very small portion of the film is lost for projection.

The possibility of attaching the end of the film at a point distant from the hub affords a very convenient means of performing this operation in an exceedingly short time while at the same time a firm and sure grip on the end of the film is assured. In order to further facilitate the insertion of the film on the reel, I prefer to turn the edge of the flanges outwardly, as shown in 29.

When the reel is intended for mounting the film on the same only and not for joining the same in case of breakage, the radial slots on the flanges can be extended to a point close to the circumference of the same without opening on the same, as shown in Figs. 2 and 5, where 30 is the hub of the reel, 31 and 32 are the flanges each provided with a slot 33, closed by a bridge 34. In this case clip 35 inserted in said slot is radially movable from a point close to the surface of said hub to a point close to the circumference of said flanges, where the end of the film can be conveniently inserted in the same.

While in both constructions I have shown radially directed slots, it is obvious that said slots can also be cut in a nonradial direction, as long as they extend between the hub and the circumference of the flanges.

Any suitable form of clip can be used in connection with my improved reel, the selection of any particular form being more or less guided by individual requirements.

In Fig. 6, I illustrate a clip which is formed in one single piece from sheet metal, the same comprises a clip portion proper 36, adapted to receive and to retain the end of the film, and a holding portion 37 formed with two recesses 38, within which the edges of a slot in the reel can be inserted; as clearly seen, said clip can be slidably inserted through said slot.

The clip illustrated in Fig. 7 is somewhat similar to the one illustrated in Fig. 6, comprising a clip portion 39 and a holding portion 40, the recesses 41 for the edges of a slot being formed by offsetting part 42 from the body of the holding member.

In Figs. 8 and 9, I illustrate another form of clip made in two pieces 43, 44, and an intermediate thickness 45 forming grooves or recesses 46, for the edges of the slot in the reel; said parts 43, 45 are bent inwardly to form a clip portion 46 with a holding tongue 47. Part 46 is further turned down at 48 if desired, to assist grooves 46 in guiding the sliding motion of said clip against the flange opposite the one having the slot through which said clip is inserted.

A still different form of clip is shown merely for purposes of illustration in Figs. 10 and 11, said clip being formed by a clip portion proper 49, made in one piece with a holding tongue 50, and provided with a holding stub 51, having notches 52 for the insertion of the same through the slot.

Many other forms of clips can be devised suitable for use in connection with my improved reel, it being understood that this would not constitute substantial departure from the spirit of my invention. As hereinbefore stated, my invention is intended primarily for use in connection with moving picture films, but it is obvious that the same can be applied as well in connection with typewriter ribbons, and in fact, in connection with any strip material to be wound upon a reel; I therefore reserve myself the right to use my invention for all the purposes mentioned and to bring to the same all those changes and modifications which may be suggested by manufacturing or individual requirements, and which may enter fairly into the scope of the appended claims.

I claim:

1. In a device of the class described, the combination of a reel having two flanges each provided with a slot extending from the hub of said reel to the edge of said flanges, said slots opening on said edges, and means for clamping the end of the strip to be wound upon said reel, adapted to be inserted through and retained by either of said slots; substantially as set forth.

2. In a device of the class described, the combination of a reel comprising a flange, provided with a slot extending between the hub of said reel and the edge of said flange, and means adapted to be inserted through and retained by said slot, independently clamping the end of the strip to be wound upon said reel.

3. In a device of the class described, the combination of a reel comprising a flange, provided with a slot extending between the hub of said reel and the edge of said flange, and a spring clip adapted to be inserted through and retained by said slot, independently clamping the end of the strip to be wound upon said reel.

4. In a device of the class described, the combination of a reel having two flanges, each provided with a slot extending from the hub of said reel to the edge of said flanges, and means for clamping the end of the strip to be wound upon said reel, adapted to be inserted through and retained by either of said slots.

DOMENICO FRISOLI.

Witnesses:
A. ABELOFF,
LOUIS A. FREEDMAN.